US009019662B2

(12) United States Patent
Aoki et al.

(10) Patent No.: US 9,019,662 B2
(45) Date of Patent: Apr. 28, 2015

(54) HEAD STACK ASSEMBLY AND DISK DRIVE WITH THE SAME

(75) Inventors: Kenichiro Aoki, Machida (JP); Toshiyuki Nakada, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 999 days.

(21) Appl. No.: 13/153,058

(22) Filed: Jun. 3, 2011

(65) Prior Publication Data
US 2012/0002328 A1 Jan. 5, 2012

(30) Foreign Application Priority Data

Jun. 30, 2010 (JP) .................................. 2010-150487

(51) Int. Cl.
*G11B 5/596* (2006.01)
*G11B 5/48* (2006.01)

(52) U.S. Cl.
CPC .................................... *G11B 5/4833* (2013.01)

(58) Field of Classification Search
USPC ............................................ 360/244.6, 244.5
See application file for complete search history.

(56) References Cited

U.S. PATENT DOCUMENTS

| 5,621,590 | A | * | 4/1997 | Pace et al. ................... 360/244.6 |
| 5,860,206 | A |   | 1/1999 | Tochiyama |
| 5,896,245 | A |   | 4/1999 | Aoyagi et al. |
| 6,061,206 | A | * | 5/2000 | Foisy et al. ................. 360/265.7 |
| 6,198,602 | B1 | * | 3/2001 | Vera et al. ................... 360/244.5 |
| 2006/0044693 | A1 | * | 3/2006 | Shimozato ................. 360/244.6 |
| 2008/0174917 | A1 | * | 7/2008 | Pottebaum et al. ......... 360/244.5 |
| 2011/0128653 | A1 | * | 6/2011 | Arnone et al. ............. 360/244.5 |

FOREIGN PATENT DOCUMENTS

| JP | 62-298012 | 12/1987 |
| JP | 07-287824 | 10/1995 |
| JP | 09-035424 | 2/1997 |
| JP | 3030232 B2 | 2/1997 |
| JP | 10-003765 | 1/1998 |

OTHER PUBLICATIONS

Information Sheet for Preparing and Information Disclosure Statement with comments for JP 3030232 B2, undated, in 1 page.
Japanese Office Action dated Aug. 31, 2011 for Japanese Application No. 2010-150487.

* cited by examiner

*Primary Examiner* — Julie Anne Watko
(74) *Attorney, Agent, or Firm* — Knobbe Martens Olson & Bear LLP

(57) ABSTRACT

According to an embodiment, a head stack assembly includes an arm including a swaged seat surface with swaged hole, a load beam supporting a head, and a baseplate secured to a proximal end portion of the load beam, including an annular protrusion secured to the swaged hole of the arm by swaging, and secured to the swaged seat surface. The arm includes a distal end portion located on a longitudinal end side of the arm with respect to the center of the swaged hole and being less rigid than the other portion of the arm around the swaged hole.

4 Claims, 8 Drawing Sheets

(Embodiment 7)

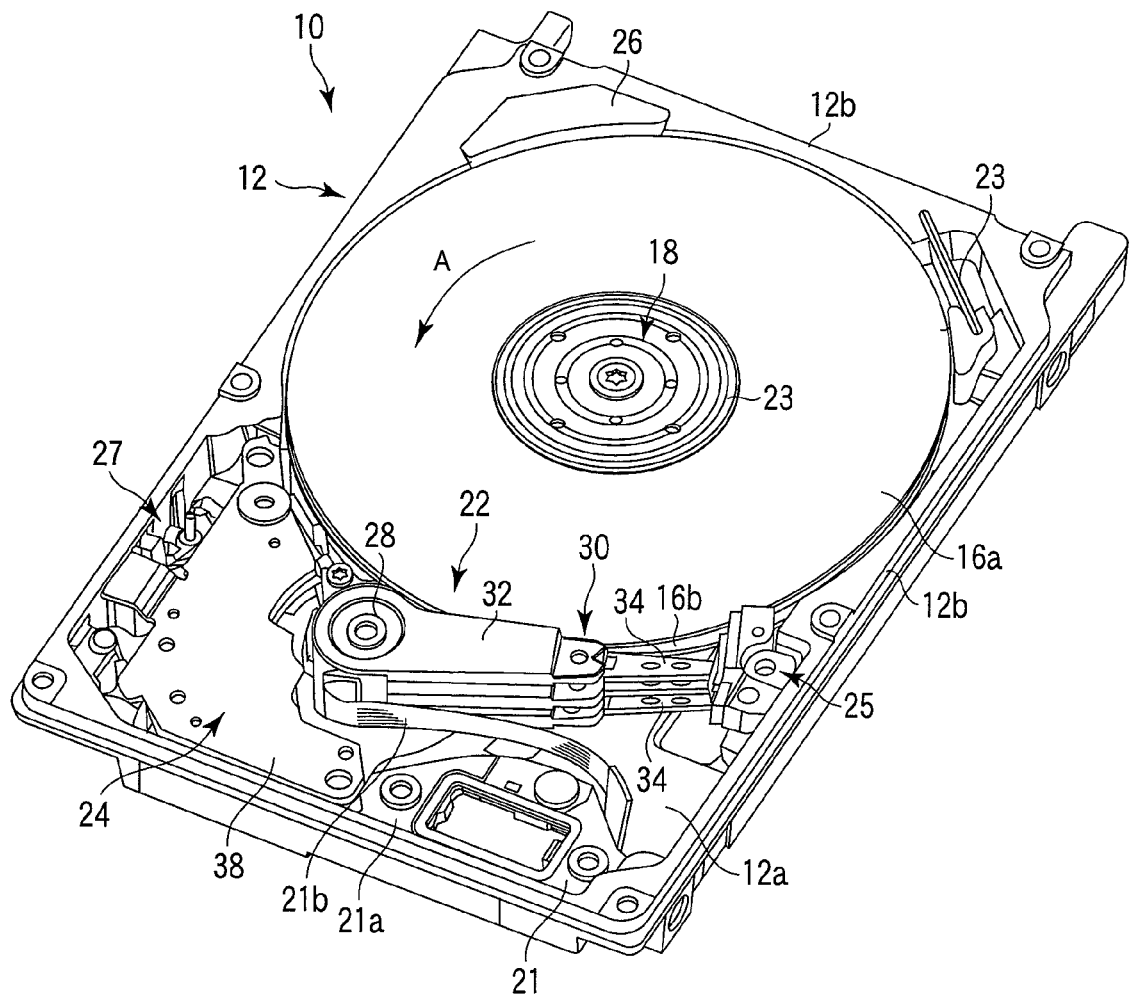
F I G. 1

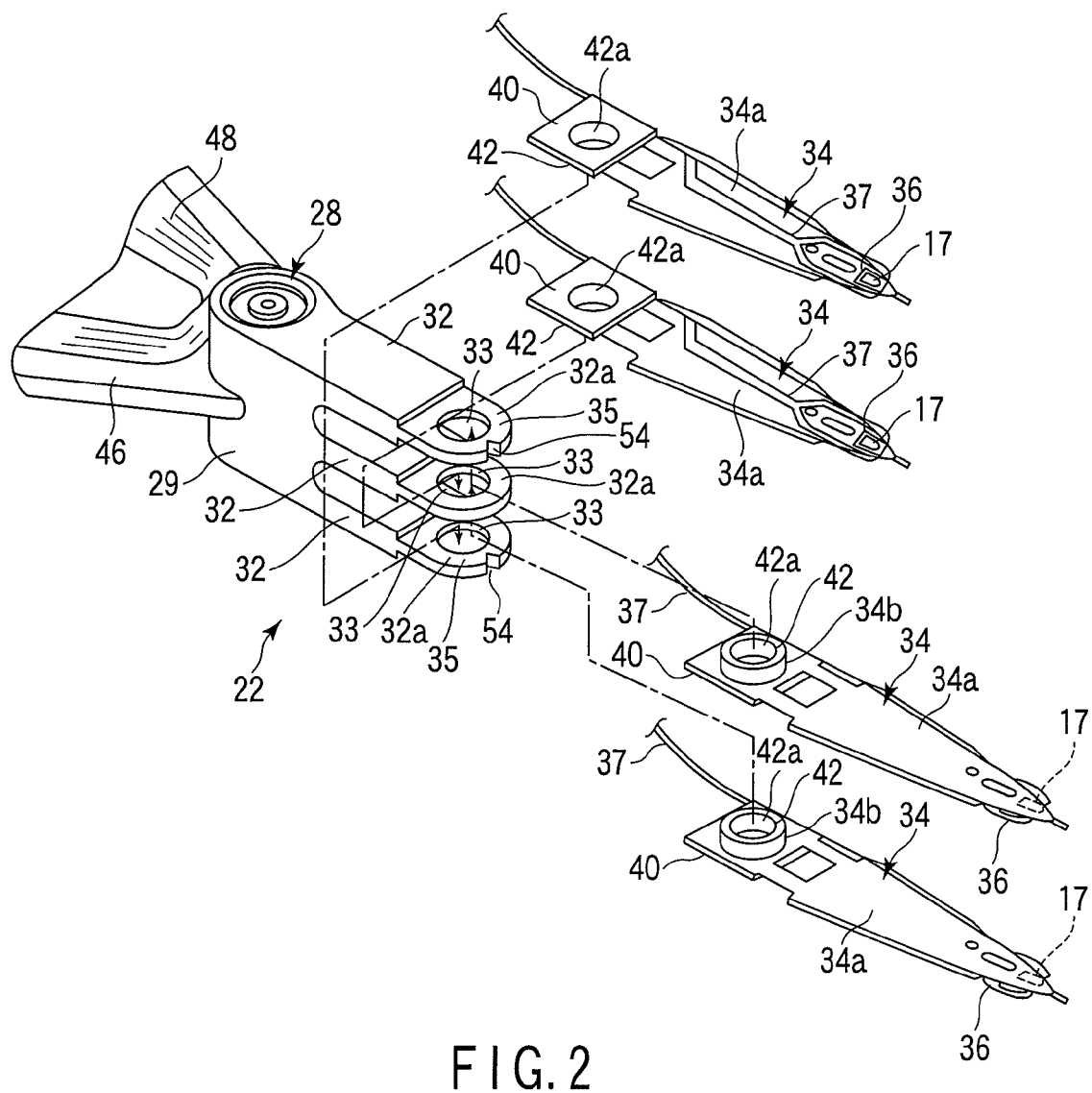
F I G. 2

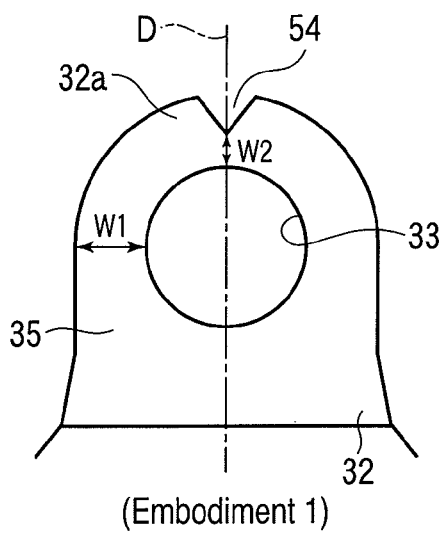
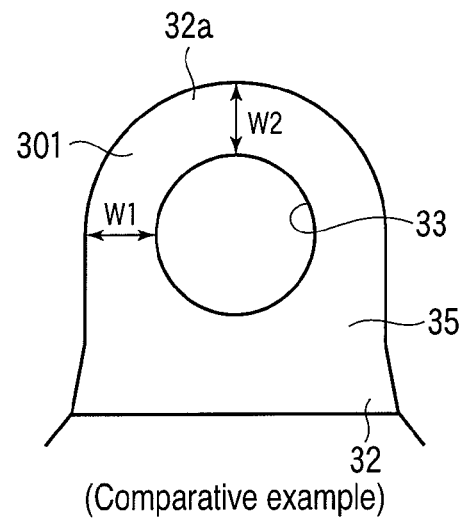
F I G. 5A (Embodiment 1)
F I G. 5B (Comparative example)
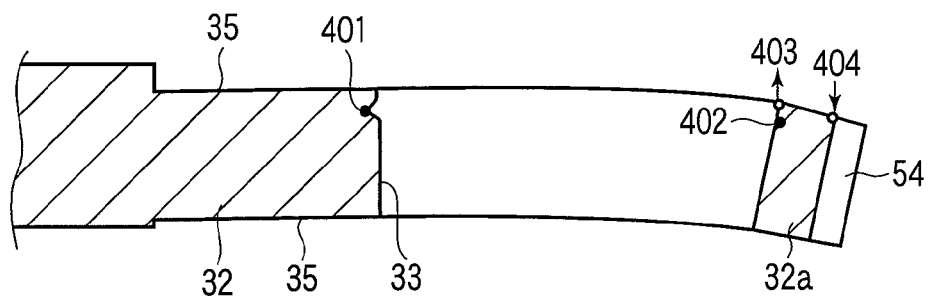
F I G. 6
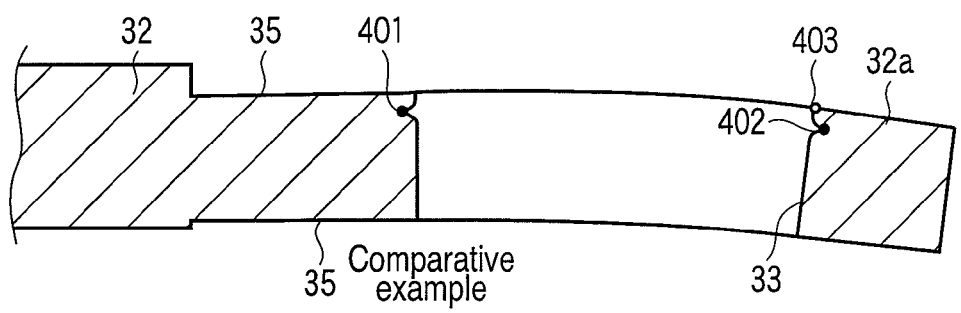
F I G. 7

| | Amount of deformation of baseplate distal end [mm] | Loosening torque [N · mm] |
|---|---|---|
| Comparative example | −0.0083 | 23.5 |
| Embodiment 1 | −0.0062 | 23.0 |

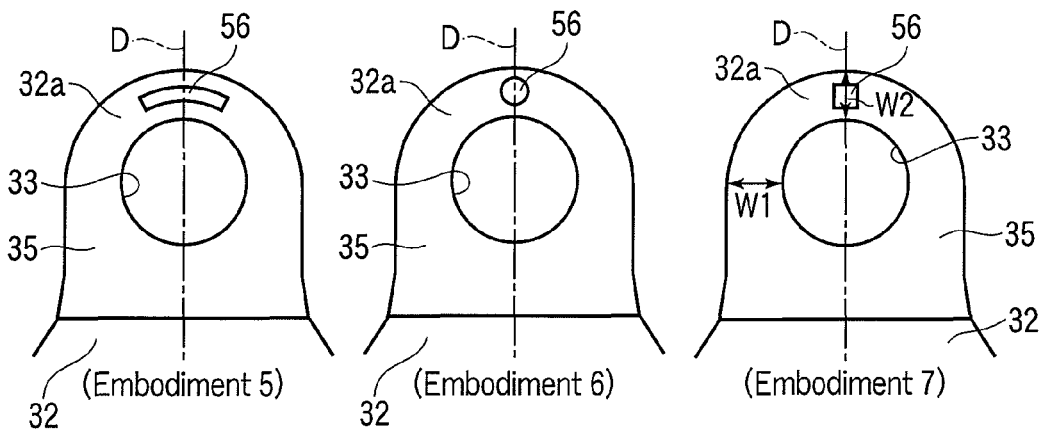
FIG. 13A (Embodiment 5)  FIG. 13B (Embodiment 6)  FIG. 13C (Embodiment 7)
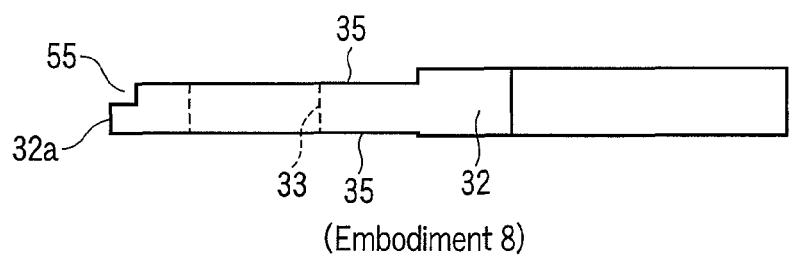
FIG. 14 (Embodiment 8)
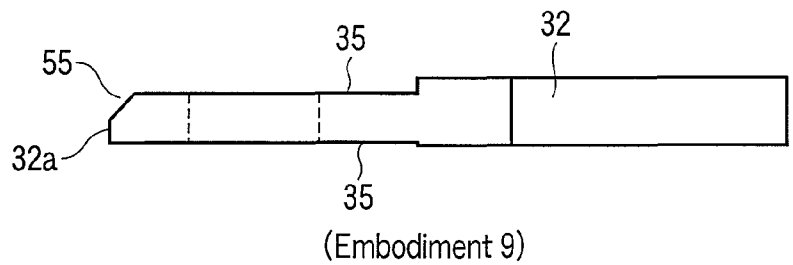
FIG. 15 (Embodiment 9)

HEAD STACK ASSEMBLY AND DISK DRIVE WITH THE SAME

CROSS-REFERENCE TO RELATED APPLICATIONS

This application is based upon and claims the benefit of priority from Japanese Patent Application No. 2010-150487, filed Jun. 30, 2010, the entire contents of which are incorporated herein by reference.

FIELD

Embodiments described herein relate generally to a head stack assembly used in a disk drive and the disk drive provided with the same.

BACKGROUND

In recent years, for example, magnetic disk drives have become widely used as large-capacity disk drives used in electronic apparatuses, such as personal computers. In general, a magnetic disk drive comprises a magnetic disk in a case, spindle motor configured to support and rotate the disk, pivotable head stack assembly (HSA) that supports magnetic heads, voice coil motor (VCM) that drives the HSA, circuit board unit, etc. The HSA comprises a plurality of head gimbal assemblies (HGAs) supported on arms, individually.

Each HGA comprises a suspension, mounted on the distal end portion of an arm, and a magnetic head supported on the suspension. The suspension comprises a load beam and a baseplate secured to the proximal end side of the load beam and the distal end portion of the arm.

The baseplate as a component of the HGA is generally fastened to the arm by ball swaging for the sake of repairability. Fastening by ball swaging is a method in which an annular protrusion formed on the baseplate is crushed against the arm and plastically deformed so that these two portions are joined together. In doing this, a ball larger in diameter than a bore of the protrusion is passed through the protrusion bore with the protrusion fitted into a circular opening in the arm.

The flying height of the head in modern magnetic disk drives is adjusted to more than 10 nm for high-density recording. Therefore, the displacement of the baseplate that occurs when the ball is swaged adversely affects the flying height and loading-unloading characteristics of each magnetic head. In the case where the baseplate is located on a swaged seat surface formed on one surface side of the arm, for example, the protrusion of the baseplate is plastically deformed by the ball and fastened to a swaged hole of the arm. As the protrusion is thus plastically deformed, the baseplate is warped. In addition to this, the swaged seat surface of the baseplate is also displaced by pressure from the protrusion of the baseplate. As the arm is displaced in this manner, the distal end of the baseplate is also greatly displaced. In the case where the baseplate is located on only one side of the arm, the displacement of the arm mainly causes the displacement of the distal end of the baseplate. If the arm and baseplate are displaced in this manner, the variation of the flying height of the magnetic head supported on the suspension is affected. Thus, the displacement of the distal end of the baseplate is expected to be reduced to improve the reliability of an HDD.

In order to improve the displacement of the distal end of the baseplate, the fastening force between the baseplate and arm may be reduced or the rigidity of the arm may be improved to reduce the displacement of the arm. If the fastening force is reduced, however, the possibility of disengagement of the baseplate increases during operation or if the HDD is jolted. Thus, the fastening force can be reduced only limitedly. Although the arm can be made more rigid by thickening its swaged seat surface, moreover, it then inevitably becomes heavier.

BRIEF DESCRIPTION OF THE DRAWINGS

A general architecture that implements the various features of the embodiments will now be described with reference to the drawings. The drawings and the associated descriptions are provided to illustrate embodiments and not to limit the scope of the invention.

FIG. 1 is an exemplary perspective view showing a hard disk drive (HDD) according to a first embodiment;

FIG. 2 is an exemplary exploded perspective view showing a head stack assembly (HSA) of the HDD;

FIG. 5A is an exemplary plan view showing the distal end portion of an arm;

FIG. 5B is an exemplary plan view showing the distal end portion of an arm according to a comparative example;

FIG. 6 is an exemplary sectional view schematically showing a deformed state of the arm distal end portion produced when a baseplate is fastened to the arm of the present embodiment by swaging;

FIG. 7 is an exemplary sectional view schematically showing a deformed state of the arm distal end portion produced when a baseplate is fastened to the arm of the comparative example by swaging;

FIGS. 13A, 13B, and 13C are exemplary plan views showing the arm distal end portions of HDDs according to fifth to seventh embodiments, respectively;

FIG. 14 is an exemplary plan view showing the arm distal end portion of an HDD according to an eighth embodiment; and FIG. 15 is an exemplary plan view showing the arm distal end portion of an HDD according to a ninth embodiment.

DETAILED DESCRIPTION

Figure 3:
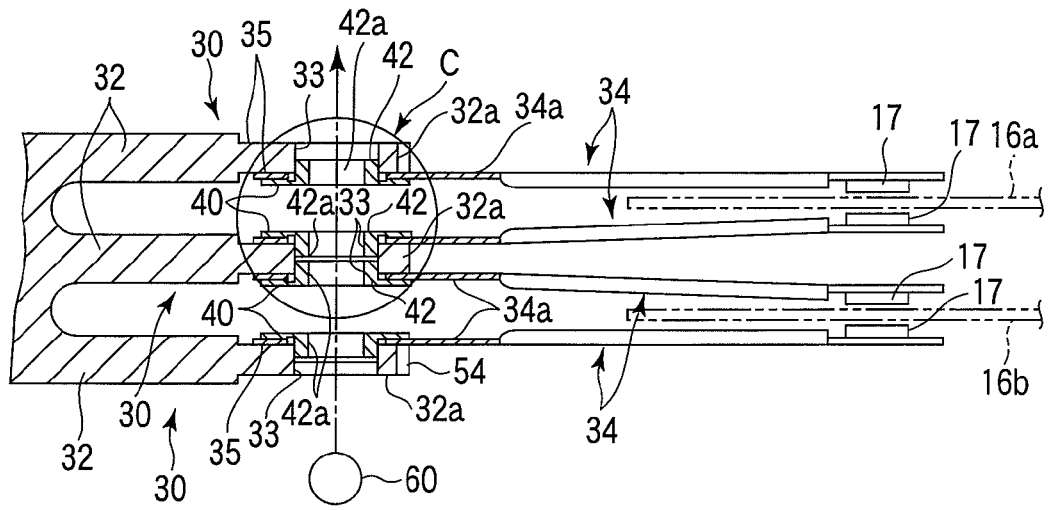
FIG. 3 is an exemplary sectional view of the HSA.

Various embodiments will be described hereinafter with reference to the accompanying drawings.

In general, according to one embodiment, a head stack assembly comprises an arm comprising a swaged seat surface comprising a swaged hole; a suspension comprising a load beam supporting a head; and a baseplate secured to a proximal end portion of the load beam, comprising an annular protrusion secured to the swaged hole of the arm by swaging, and secured to the swaged seat surface. The arm comprises a distal end portion located on a longitudinal end side of the arm with respect to the center of the swaged hole and being less rigid than the other portion of the arm around the swaged hole.

A hard disk drive (HDD) according to a first embodiment will now be described in detail.

FIG. 1 shows the internal structure of the HDD with its top cover removed. As shown in FIG. 1, the HDD comprises a case 10. The case 10 comprises a base 12 in the form of an open-topped rectangular box and a top cover (not shown), which is attached to the base by screws so as to close the top opening of the base. The base 12 comprises a rectangular bottom wall 12a and sidewall 12b set up along the peripheral edge of bottom wall.

The case 10 contains a spindle motor 18 for use as a drive section and two magnetic disks 16a and 16b. The spindle motor 18 is mounted on the bottom wall 12a of the base 12. The disks 16a and 16b are supported and rotated by the spindle motor. Further, the case 10 contains a plurality of magnetic heads 17 (see FIG. 2), head stack assembly (HSA) 22, and voice coil motor (VCM) 24. The magnetic heads record data on and reproduce data from the disks 16a and 16b. The HSA 22 supports the heads for movement relative to the disks 16a and 16b. The VCM 24 pivots and positions the HSA 22. The case 10 also contains a ramp loading mechanism 25, latch mechanism 27, and board unit 21. The ramp loading mechanism 25 holds the magnetic heads in a retracted position off the magnetic disks 16a and 16b when the heads are moved to the outermost peripheries of the disks. The latch mechanism 27 holds the HSA in its retracted position if the HDD is jolted. The board unit 21 comprises a preamplifier and the like.

A printed circuit board (not shown) is attached to the outer surface of the bottom wall 12a of the base 12 by screws. This circuit board controls the operations of the spindle motor 18, VCM 24, and magnetic heads 17 through the board unit 21. The base 12 is provided with a circulatory filter 23 that removes dust and the like from the case 10 and an intake filter 26 that traps dust and the like in the external air introduced into the case 10.

Each of the magnetic disks 16a and 16b for use as recording media has a diameter of, for example, 65 mm (2.5 inches) and comprises magnetic recording layers on its upper and lower surfaces, individually. The two disks 16a and 16b are coaxially mounted on a hub (not shown) of the spindle motor 18 and clamped and secured to the hub by a clamp spring 23. Thus, the magnetic disks 16a and 16b are supported parallel to the bottom wall 12a of the base 12. The disks 16a and 16b are rotated at a predetermined speed, e.g., 7,200 or 10,000 rpm, by the spindle motor 18.

Figure 4:
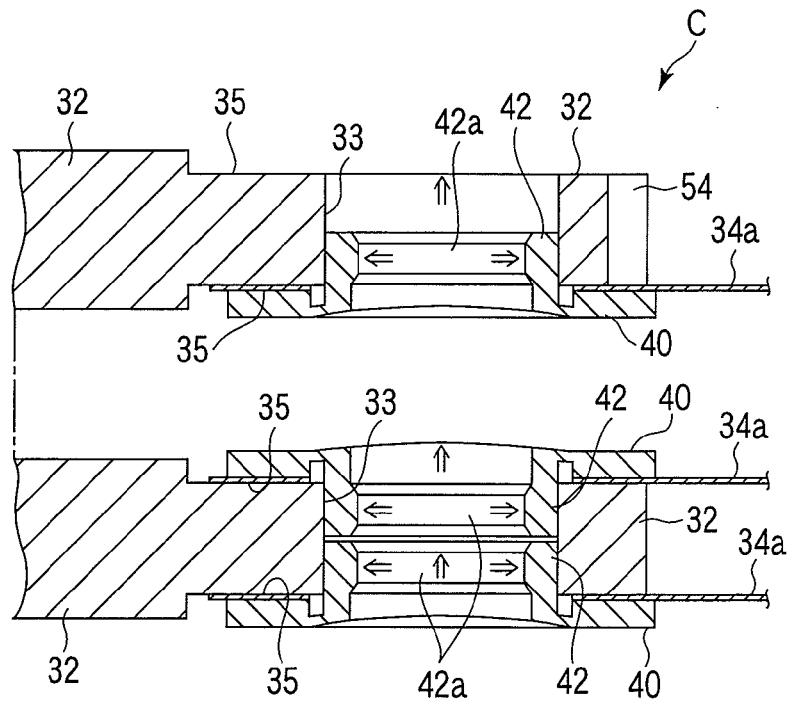
FIG. 4 is an exemplary enlarged sectional view showing a part of the HSA.

FIG. 2 is an exploded perspective view showing the HSA 22, FIG. 3 is a side view of the HSA, and FIG. 4 is an enlarged sectional view showing a part of the HSA.

As shown in FIGS. 2 and 3, the HSA 22 comprises a rotatable bearing unit 28, a plurality (e.g., three) of arms 32, and four head gimbal assemblies (HGAs) 30 mounted on the arms. The bearing unit 28 is located at a distance from the center of rotation of the magnetic disks 16a and 16b longitudinally relative to the base 12 and near the outer peripheral edges of the disks. The bearing unit 28 comprises a pivot set up on the bottom wall 12a of the base 12 and a cylindrical sleeve 29 rotatably supported on the pivot by bearings.

In the present embodiment, the three arms 32 are formed integrally with the sleeve 29 of the bearing unit 28 in a so-called E-block configuration. Alternatively, the arms 32 may be formed independently of one another and stacked in layers on the bearing unit.

Each HGA 30 comprises a suspension 34 and magnetic head 17 supported thereon and is mounted on the distal end portion of each corresponding arm. Two of the HGAs 30 are mounted on the central arm 30.

As shown in FIGS. 2 to 4, each arm 32 is an elongated flat plate of, for example, stainless steel, aluminum, etc. The arm 32 comprises a distal end portion 32a on its extended end side, and swaged seat surfaces 35 having a circular swaged hole 33 are formed individually on the upper and lower surfaces of the distal end portion. As described later, a notch 54 is formed in the distal end portion of each of the upper and lower arms 32, whereby the rigidity of the distal end portion is reduced. This notch may be formed in the central arm 32 for ease of manufacture.

The suspension 34 comprises a load beam 34a in the form of an elongated plate spring and a gimbal 36 mounted on the extended end side of the load beam. Further, the suspension 34 comprises a conductor trace (flexure) 37, which is disposed on the gimbal 36 and load beam 34a and electrically connected to its corresponding magnetic head 17. The conductor trace 37 is drawn out from the load beam 34a and extends along the arm 32 to the vicinity of the bearing unit 28. The magnetic head 17 is electrically connected to a main FPC 21b (described later) through the conductor trace 37.

A substantially rectangular baseplate 40 is secured to the proximal end portion of the load beam 34a. The baseplate 40 integrally comprises an annular protrusion 42 in its central portion, which projects on one surface side of the baseplate. In the present embodiment, that surface of the baseplate 40 from which the protrusion 42 protrudes is secured to the load beam 34a, and the protrusion 42 projects from the load beam through an opening 34b in its proximal end portion. Alternatively, the opposite surface of the baseplate 40 to the surface from which the protrusion 42 protrudes may be secured to the proximal end portion of the load beam 34a.

The baseplate 40 is secured to the swaged seat surface 35 of the arm 32 in such a manner that its protrusion 42 is fitted into the swaged hole 33 of the arm 32 and fastened to the arm by ball swaging. Thus, the suspension 34 is secured to the distal end portion of the arm 32 and extends from the arm. As schematically shown in FIGS. 3 and 4, the annular protrusion 42 on the baseplate 40 is crushed against the arm 32 and plastically deformed so that these two portions are fastened together by ball swaging. In this ball swaging, a ball 60 larger in diameter than a bore 42a of the protrusion 42 is passed through the bore 42a from below, for example, with the protrusion 42 fitted into the swaged hole 33 of the arm 32.

In the uppermost HGA 30, as shown in FIGS. 2 to 4, the baseplate 40 and suspension 34 are secured to the swaged seat surface 35 on the lower surface side. In the central HGA 30, the baseplates 40 and suspensions 34 are secured to both the upper and lower swaged seat surfaces 35. In the lowermost HGA 30, the baseplate 40 and suspension 34 are secured to the swaged seat surface 35 on the upper surface side.

The three HGAs 30 are arranged side by side so as to face one another in substantially parallel relation with predetermined spaces therebetween. The three arms 32 are located parallel to one another with predetermined spaces therebetween and extend in the same direction from the bearing unit 28. The suspensions 34 secured individually to the uppermost arm 32 and the upper swaged seat surface 35 of the central arm 32 are located parallel to each other with a predetermined space therebetween, and the magnetic heads 17 on these suspensions face each other. These heads 17 are arranged so as to hold the magnetic disk 16a from both sides.

The suspensions 34 secured individually to the lowermost arm 32 and the lower swaged seat surface 35 of the central arm 32 are located parallel to each other with a predetermined space therebetween, and the magnetic heads 17 on these suspensions face each other. These heads 17 are arranged so as to hold the magnetic disk 16b from both sides.

As shown in FIG. 2, the HSA 22 comprises a support frame 46 extending from the sleeve 29 of the bearing unit 28 on the opposite side to the arms 32. The support frame 46 supports a voice coil 48 that constitutes a part of the VCM 24. The support frame 46, which is formed of a synthetic resin, is integrally molded on the outer periphery of the voice coil 48. As shown in FIG. 1, the voice coil 48 is located between a pair of yokes secured to the base 12. Thus, the voice coil, along with the yokes and a magnet secured to one of the yokes, constitutes the VCM 24.

If the voice coil 48 is energized, the HSA 22 is pivoted around the bearing unit 28 between a retracted position where the magnetic heads 17 are located off the outer peripheries of the magnetic disks 16a and 16b and a data processing position where the heads 17 are located on the disks. Thus, the heads 17 are moved to and positioned over desired tracks of the disks 16a and 16b, individually.

As shown in FIG. 1, the board unit 21 comprises a main body 21a formed of a flexible printed circuit board, which is secured to the bottom wall 12a of the base 12. Electronic components, including a head amplifier, are mounted on the main body 21a. The board unit 21 comprises the main flexible printed circuit board (main FPC) 21b extending from the main body 21a. An extended end of the main FPC 21b is connected to the vicinity of the bearing unit 28 of the HSA 22 and further electrically connected to each magnetic head 17 through the conductor trace 37 of each HGA 30.

The following is a further detailed description of a fastening structure between the arm 32 and baseplate 40 in each HGA 30. As shown in FIGS. 2, 4 and 5A, the notch 54 for reducing the rigidity of the distal end portion 32a of each of the upper and lower arms 32 is formed in the distal end portion. The notch 54 is, for example, V-shaped and is formed throughout the thickness of the arm 32. Further, the notch 54 is bilaterally symmetrical with respect to the central axis D of the arm 32 that passes through the center of the swaged hole 33. By the formation of this notch 54, width W2 of the arm distal end portion 32a on the longitudinal distal end side of the arm 32 with respect to the center of the swaged hole 33 is made less than width W1 of the other portion around the swaged hole 33, and the cross-sectional area of the distal end portion 32a is also made less than that of the other portion. Consequently, the distal end portion 32a is less rigid than the other portion around the swaged hole 33.

Since the distal end portion 32a of the arm 32 is thus made less rigid than the other portion around the swaged hole 33, deformations of the arm distal end portion and baseplate 40 can be reduced when the baseplate 40 is fastened to the swaged seat surface 35 of the arm 32.

The inventor hereof compared deformations of the arm 32 according to the present embodiment and an arm according to a comparative example caused as the baseplate is fastened, as plastic deformations based on the finite element method. FIG. 5B shows the arm 32 of the comparative example. This arm 32 does not comprises a notch and is designed so that width W2 of its distal end portion and width W1 of the other portion around the swaged hole 33 are equal, and therefore, these portions are substantially equal in rigidity.

FIG. 6 shows a deformed state of the arm 32 of the present embodiment, and FIG. 7 shows that of the arm 32 of the comparative example.

In the arm 32 of the present embodiment, as seen from these drawings, the swaged seat surface 35 is deformed by force from the plastically deformed protrusion 42 during the fastening operation. Deformation of the baseplate 40 affected by the arm 32 depends on an inclination between junctions 401 and 402 between the protrusion 42 and arm 32. Since the rigidity of the distal end portion 32a is low, according to the present embodiment, the arm 32 is forced by junction 402 on the distal end side to be deformed so as to rotate clockwise. Consequently, point 403 on the distal end edge of the swaged hole 33, on the swaged seat surface 35, is displaced to a position higher than the position of point 403 on the arm 32 of the comparative example. Further, point 404 shifted from the position of point 403 by W1 toward the distal end, on the swaged seat surface 35, is displaced to a position lower than the position of point 404 on the arm 32 of the comparative example. Consequently, in the arm 32 of the present embodiment, the position of junction 402 between the baseplate 40 and swaged hole 33 is displaced to a position higher than the position of junction 402 of the arm of the comparative example, and its inclination relative to the position of junction 401 is reduced. Thus, the displacement of the baseplate 40 is reduced.

Figures 8, 9:
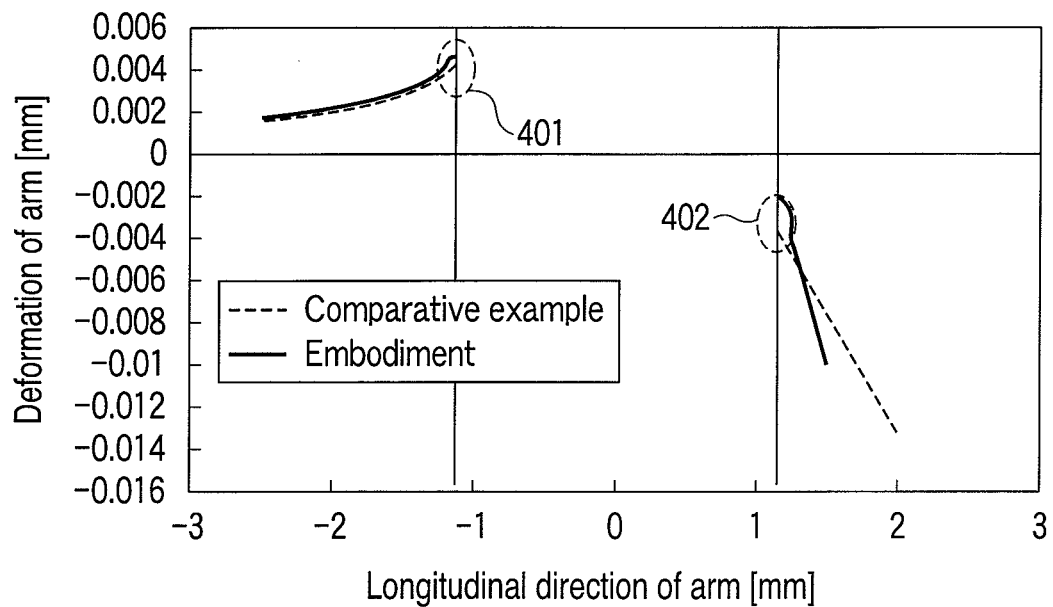
FIG. 8 is an exemplary diagram comparatively showing the deformed states of the arms of the present embodiment and comparative example.
FIG. 9 is an exemplary diagram comparatively showing the distal end deformation amount and loosening torque for each of the baseplates attached individually to the arms of the present embodiment and comparative example.

FIG. 8 shows deformation profiles on lines that pass through junctions 401 and 402 with respect to the two types of arms. In FIG. 8, the abscissa represents the longitudinal position of the arm with respect to the center of the swaged hole assumed to be at 0, while the ordinate represents the amount of thicknesswise deformation of the arm. As seen from FIG. 8, the displacement amount at junction 402 is less in the arm of the present embodiment than in the arm of the comparative example, and the inclination relative to junction 401 is less than in the comparative example.

FIG. 9 shows the deformation amount of the distal end portion of the baseplate 40 and fastening force between the arm and baseplate for each of the cases of the present embodiment and comparative example. According to the present embodiment, the inclination between junctions 401 and 402 is reduced, so that the amount of deformation of the distal end portion of the baseplate 40 is improved by 25% compared with that of the comparative example, although the loosening torque of the baseplate undergoes no variation.

Figure 10:
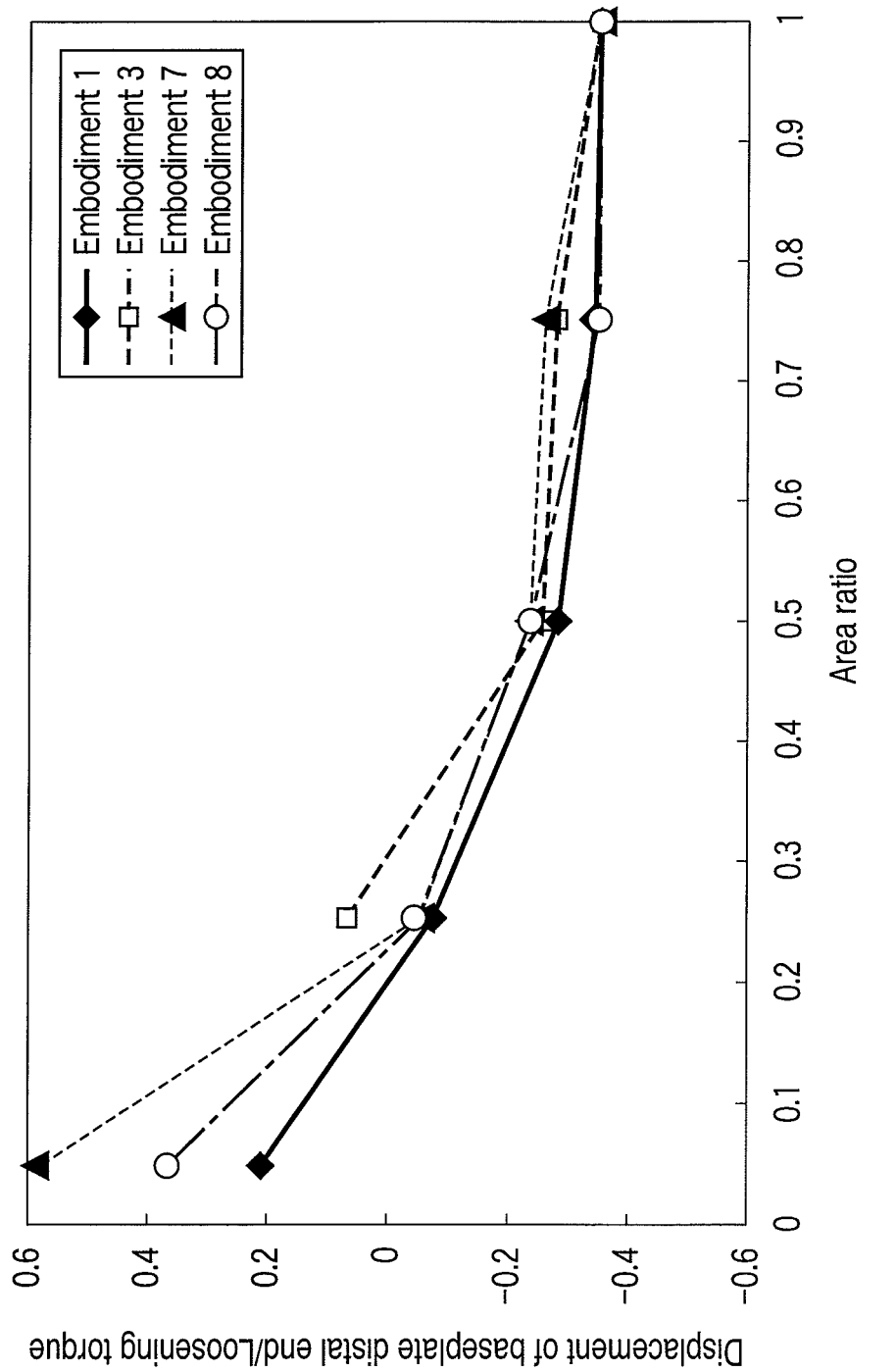
FIG. 10 is an exemplary diagram showing relationships between the ratio between the respective cross-sectional areas of the arm distal end portion and the other portion around a swaged hole, the deformation amount of the distal end of the baseplate, and the loosening torque.

FIG. 10 shows relationships between the cross-sectional area ratio (W2/W1 in the first embodiment) between the distal end portion 32a of the arm 32 and the other portion around the swaged hole 33 and the quotient of the deformation amount of the distal end portion of the baseplate divided by the loosening torque. As seen from FIG. 10, the deformation amount of the baseplate per unit loosening torque can be improved by reducing the cross-sectional area ratio (W2/W1) to, for example, 0.5 or less.

Thus, according to the present embodiment, the amount of deformation of the baseplate can be reduced by forming the notch 54 to make the distal end portion 32a less rigid than the other portion around the swaged hole. In other words, the deformation amount of the baseplate can be reduced without reducing the fastening force between the arm and baseplate or thickening the arm to increase its rigidity. Accordingly, the flying height of the magnetic head 17 can be prevented from being varied by the deformation of the distal end portion of the baseplate, so that an HSA and HDD with improved reliability can be obtained.

The following is a description of an HDD and HSA according to another embodiment.

The configuration that reduces the rigidity of the arm distal end portion is not limited to the above-described one in which the rigidity is reduced by forming the V-shaped notch. This configuration may be replaced with one in which the rigidity is reduced by forming a notch of another shape, cutting the distal end portion, or forming a through-hole in the distal end portion.

Figure 11:
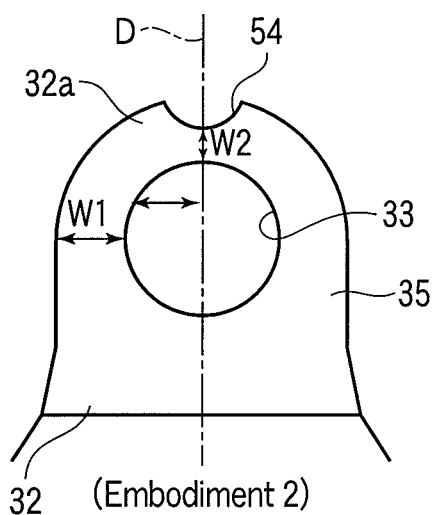
FIG. 11 is an exemplary plan view showing the arm distal end portion of an HDD according to a second embodiment.

According to the second embodiment, as shown in FIG. 11, a semicircular notch 54 is formed in a distal end portion 32a of an arm 32. The notch 54 is formed throughout the thickness of the arm 32. The notch 54 is bilaterally symmetrical with respect to the central axis D of the arm 32 that passes through the center of a swaged hole 33. By the formation of this notch 54, width W2 of the arm distal end portion 32a on the longitudinal distal end side of the arm 32 with respect to the center of the swaged hole 33 is made less than width W1 of the other portion around the swaged hole 33, and the cross-sectional area of the distal end portion 32a is also made less than that of the other portion. Consequently, the distal end portion 32a is less rigid than the other portion around the swaged hole 33. The notch 54 may alternatively be formed to have a rectangular, elliptical, or any other suitable shape.

Figures 12A, 12B:
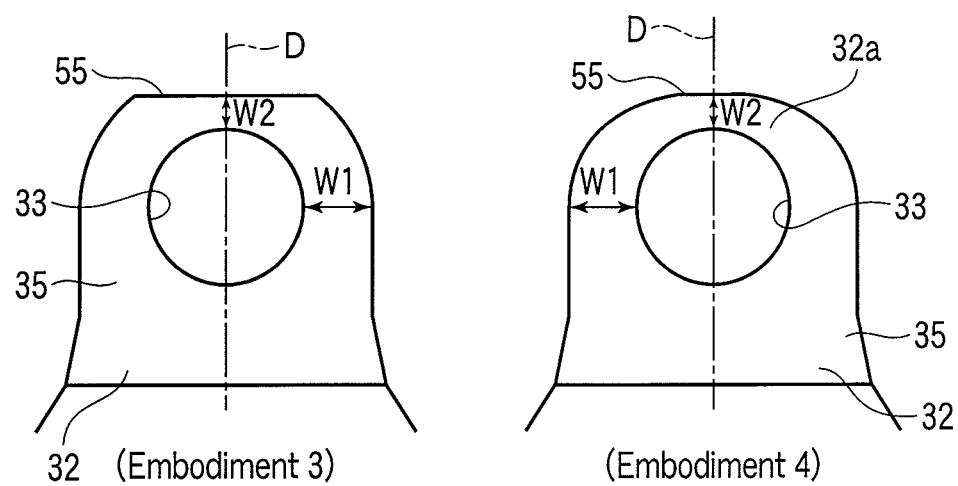
FIG. 12A is an exemplary plan view showing the arm distal end portion of an HDD according to a third embodiment.
FIG. 12B is an exemplary plan view showing the arm distal end portion of an HDD according to a fourth embodiment.

According to a third embodiment, as shown in FIG. 12A, a distal end portion 32a of an arm 32 is cut along a straight cut surface 55. The cut surface 55 is formed throughout the thickness of the arm 32. The cut surface 55 is bilaterally symmetrical with respect to the central axis D of the arm 32 that passes through the center of a swaged hole 33. By cutting the arm 32, width W2 of the arm distal end portion 32a is made less than width W1 of the other portion around the swaged hole 33, and the cross-sectional area of the distal end portion 32a is also made less than that of the other portion. Consequently, the distal end portion 32a is less rigid than the other portion around the swaged hole 33.

According to a fourth embodiment, as shown in FIG. 12B, a distal end portion 32a of an arm 32 is cut along an arcuate cut surface 55. The cut surface 55 is formed throughout the thickness of the arm 32. The cut surface 55 is bilaterally symmetrical with respect to the central axis D of the arm 32 that passes through the center of a swaged hole 33. By cutting the arm 32, width W2 of the arm distal end portion 32a is made less than width W1 of the other portion around the swaged hole 33, so that the distal end portion 32a is less rigid than the other portion.

According to a fifth embodiment, as shown in FIG. 13A, a through-hole 56 is formed in that part of a distal end portion 32a of an arm 32 which is located between a swaged hole 33 and the arm distal end. The through-hole 56 extends thicknesswise through the arm 32. Further, the through-hole 56 is, for example, arcuate and bilaterally symmetrical with respect to the central axis D of the arm 32 that passes through the center of the swaged hole 33. By forming the through-hole 56 in the distal end portion 32a, the cross-sectional area of the distal end portion 32a is made less than that of the other portion around the swaged hole 33. Consequently, the distal end portion 32a is less rigid than the other portion around the swaged hole 33.

The through-hole 56 is not limited to the arcuate shape and may be of any other suitable shape. According to a sixth embodiment, as shown in FIG. 13B, a circular through-hole 56 is formed in that part of a distal end portion 32a of an arm 32 which is located between a swaged hole 33 and the arm distal end. According to a seventh embodiment, as shown in FIG. 13C, a rectangular through-hole 56 is formed in that part of a distal end portion 32a of an arm 32 which is located between a swaged hole 33 and the arm distal end. In FIGS. 13A to 13C, width W1 of the distal end portion 32a has a value obtained by subtracting the width of the through-hole 56 from that of the distal end portion.

The configuration in which the arm distal end portion 32a is cut throughout its thickness may be replaced with one in which the arm distal end portion is partially cut thicknesswise. According to an eighth embodiment, as shown in FIG. 14, a distal end portion 32a is cut along a cut surface 55 the upper side of which is substantially right-angled. According to a ninth embodiment, as shown in FIG. 15, a distal end portion 32a is cut along a cut surface 55 that obliquely extends from its upper surface toward the distal end surface.

FIG. 10 shows relationships between the cross-sectional area ratio between the distal end portion 32a and the other portion around the swaged hole and the quotient of the deformation amount of the distal end portion of the baseplate divided by the loosening torque, for the arms according to the first, third, seventh, and eighth embodiments. In the first, third, and seventh embodiments, the cross-sectional area ratio is W2/W1. In the eighth embodiment, the cut is formed from a neutral plane of the arm to the upper surface. Thus, the cross-sectional area is calculated for the range from the neutral plane to the upper surface of the arm. In any of these embodiments, as seen from FIG. 10, the deformation amount of the distal end portion of the baseplate per unit loosening torque can be improved by reducing the cross-sectional area ratio to, for example, 0.5 or less.

In the second to ninth embodiments described above, other configurations of the HSA and HDD are the same as those of the first embodiment, and a detailed description thereof is omitted. Also in the second to ninth embodiments, the deformation amount of the baseplate can be reduced by making the distal end portion 32a less rigid than the other portion around the swaged hole. Thus, these embodiments can provide the same functions and effects as those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the magnetic disks are not limited to 2.5-inch disks and may be of other sizes. Further, the disks used are not limited to two in number and may be one or three or more. The number of HGAs may also be varied according to the number of installed disks.

What is claimed is:
1. A head stack assembly comprising:
an arm comprising a swaged seat surface comprising a swaged hole, the arm comprising a first end portion proximate the swaged hole located at a longitudinal end of the arm, and a notch formed at the first end portion of the arm away from the swaged hole and formed throughout a thickness of the arm, a width of the arm between the swaged hole and an edge of the notch being made less than a width of other portions of the arm around the swaged hole, the first end portion being less rigid than a second portion of the arm proximate the swaged hole;
a suspension comprising a load beam configured to support a head; and a baseplate secured to an end portion of the load beam, comprising an annular protrusion secured to the swaged hole of the arm by swaging, and secured to the swaged seat surface.

2. The head stack assembly of claim 1, wherein the notch is symmetrical with respect to a central axis of the arm passing through the center of the swaged hole.

3. A disk drive comprising:

a disk recording medium;

a drive motor configured to support and rotate the recording medium; and a head stack assembly configured to support a head, the head being configured to perform data processing for the recording medium and to be movable relative to the recording medium, the head stack assembly comprising an arm comprising a swaged seat surface comprising a swaged hole, the arm comprising a first end portion proximate the swaged hole located on a longitudinal end side of the arm, and a notch formed at the first end portion of the arm away from the swaged hole and formed throughout a thickness of the arm, a width of the arm between the swaged hole and an edge of the notch being made less than a width of other portions of the arm around the swaged hole, the first end portion being less rigid than a second portion of the arm proximate the swaged hole;

a suspension comprising a load beam supporting the head; and a baseplate secured to an end portion of the load beam, comprising an annular protrusion secured to the swaged hole of the arm by swaging, and secured to the swaged seat surface.

4. The disk drive of claim 3, wherein the notch is symmetrical with respect to a central axis of the arm passing through the center of the swaged hole.

* * * * *